United States Patent [19]
Kagle

[11] Patent Number: 6,148,149
[45] Date of Patent: Nov. 14, 2000

[54] AUTOMATIC IMAGE ROTATION IN DIGITAL CAMERAS

[75] Inventor: Jonathan Kagle, Redmond, Wash.

[73] Assignee: Microsoft Corporation, Redmond, Wash.

[21] Appl. No.: 09/085,144

[22] Filed: May 26, 1998

[51] Int. Cl.[7] ................................................. G03B 17/00
[52] U.S. Cl. ........................ 396/50; 358/909.1; 348/231
[58] Field of Search ........................ 396/50, 311, 321, 396/374, 543, 13; 358/906, 909.1; 348/333, 239, 240, 231, 232

[56] References Cited

U.S. PATENT DOCUMENTS 5,262,867  11/1993  Kojima ............................... 358/909.1 X
5,576,759  11/1996  Kawamura et al. ..................... 348/231
5,900,909   5/1999  Parulski et al. ........................ 348/232

*Primary Examiner*—W. B. Perkey
*Attorney, Agent, or Firm*—Lee & Hayes, PLLC

[57] ABSTRACT

A digital camera comprises a controller and an image sensor that digitally captures an image. The camera also includes an orientation sensor, such as a mercury switch, that that indicates orientation of the image sensor whenever an image is captured. When capturing an image, the controller is configured to format the image in a way that it will be correctly oriented when displayed. In one embodiment, the camera automatically rotates the digital image to correct for different orientations of the camera.

15 Claims, 4 Drawing Sheets

AUTOMATIC IMAGE ROTATION IN DIGITAL CAMERAS

TECHNICAL FIELD

This invention relates to digital cameras and to methods of correcting for camera rotation when acquiring digital images with such cameras.

BACKGROUND OF THE INVENTION

Digital cameras are becoming more and more popular as their price decreases and the quality of their images increases. Consumers like digital cameras because images taken with such cameras can be quickly viewed on a computer. In addition, a computer can be used to correct and alter digital images. This allows the photographer to exercise a high degree of control and creativity, without complex chemical procedures.

Thus, the involvement of a computer in the picture-taking process allows functions that were previously obtainable only in conjunction with a photo processing lab. On the other hand, however, the computer adds a step that was previously not required for viewing snapshots. With film-based technology, a consumer could simply drop a film cartridge with a photo developer and pick up the resulting prints. Although this did not provide the creative opportunities that are possible with digital images, it was simpler and required less effort.

One specific inconvenience when using digital cameras, which this invention addresses, relates to correcting images that are taken when the digital camera is rotated 90° from its normal orientation. When held normally, a camera captures an image having a larger width dimension than height dimension. The resulting image is said to be in a "landscape" orientation. In many instances, however, a user wishes to create an image having a larger height dimension as compared to the width dimension. The resulting image is said to be in a "portrait" orientation. To capture an image with a portrait orientation, the user simply rotates the camera 90°.

With film-based cameras this presents no particular difficulties. Landscape and portrait images are oriented differently on the exposed film. However, prints can be made from the film without any knowledge of the actual orientation. When a user browses through the prints, he or she simply rotates them, by hand, to the correct viewing orientation.

With a digital camera, however, images are often displayed on a computer monitor. Any images taken in the portrait orientation will be displayed at 90° from their desired orientation. Since a computer monitor cannot be easily rotated to correct for pictures taken at different orientations, it is usually desired to rotate the pictures digitally before viewing.

Although this is a task that can be readily performed by the user's computer, the task also requires user intervention. Thus, when a user downloads pictures from a digital camera, each picture needs to be viewed and checked for correct orientation. User intervention is required to rotate any pictures that were taken in the portrait orientation. Although this process is not difficult, it requires time and can become tedious when downloading and correcting dozens of pictures.

SUMMARY OF THE INVENTION

In accordance with the invention, a digital camera is equipped with a sensor that indicates orientation of the camera at the time an image is captured. The camera notes the orientation and creates an image object in a predefined image format that indicates correct orientation of the image based on the orientation of the camera when the image was captured. In one embodiment, the camera simply sets a flag that indicates whether the image needs to be rotated for viewing. In another embodiment, the camera automatically reformats the digital version of the image to reflect the proper orientation of the image, before sending the digital picture to a personal computer or other viewing device. This eliminates the need to preview and rotate pictures when downloading them to the computer.

DETAILED DESCRIPTION

Figure 1:
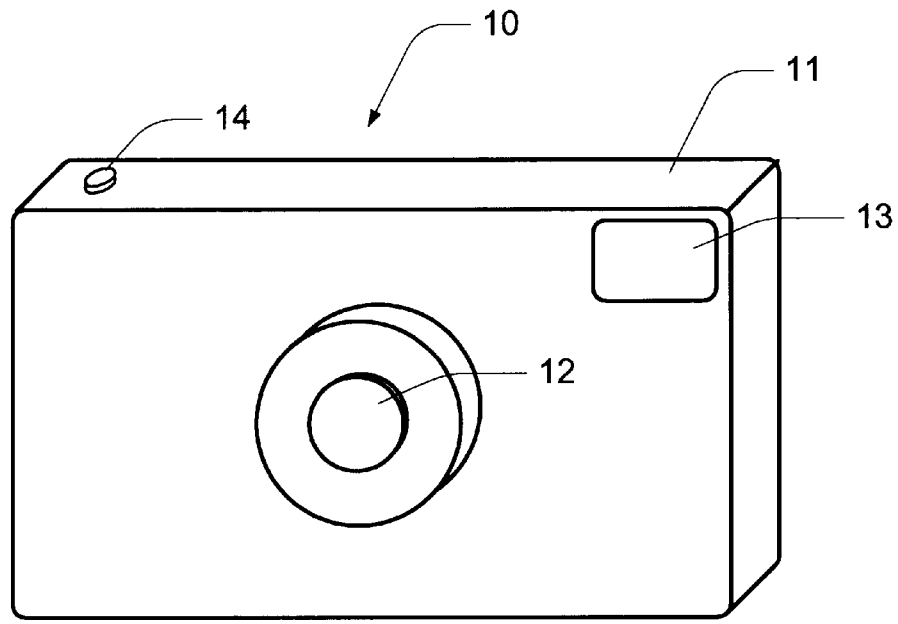
FIG. 1 is a front perspective view of a digital camera in accordance with the invention.

FIG. 1 shows a digital camera 10 in accordance with the invention. Camera 10 comprises a case or housing 11 and a lens 12 mounted thereon that focuses on an image that is to be digitally captured. Camera 10 includes a viewfinder 13 and a button 14 that triggers or initiates image capture. Camera 10 is shown in its default, landscape orientation.

Figure 2:
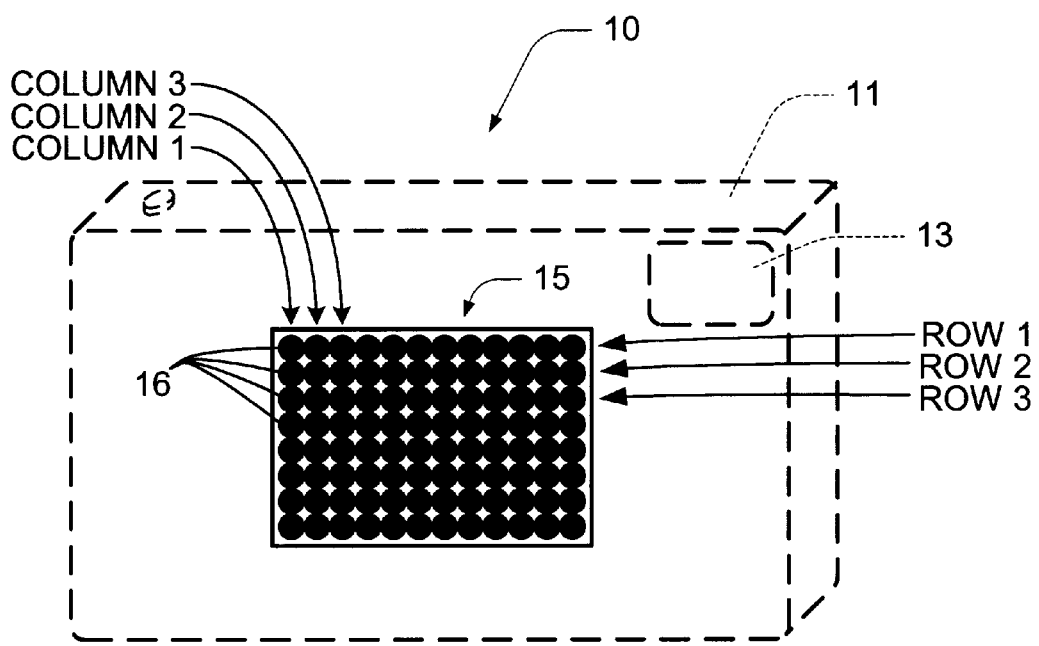
FIG. 2 is a diagrammatic view showing the position and orientation of an image sensor array within the digital camera shown in FIG. 1, with the digital camera in a landscape orientation.

FIG. 2 illustrates the position and orientation of an image sensor array 15 within camera 10. The image sensor comprises a rectangular array of individual pixel sensors 16, arranged in rows and columns. In most cameras, there are more columns than rows, so that a captured image will have conventional landscape dimensions (in which the width is greater than the height). When capturing an image, the rows and columns of pixel sensors produce corresponding rows and columns of pixel data. When the camera is in its default orientation as shown, the rows are oriented horizontally and the columns are oriented vertically. Rows 1–3 and columns 1–3 are labeled in FIG. 2.

Note that only a limited number of pixel sensors are shown in FIG. 2 for purposes of illustration, as compared to the much greater number of pixel sensors in most commercial image sensor arrays.

Figure 3:
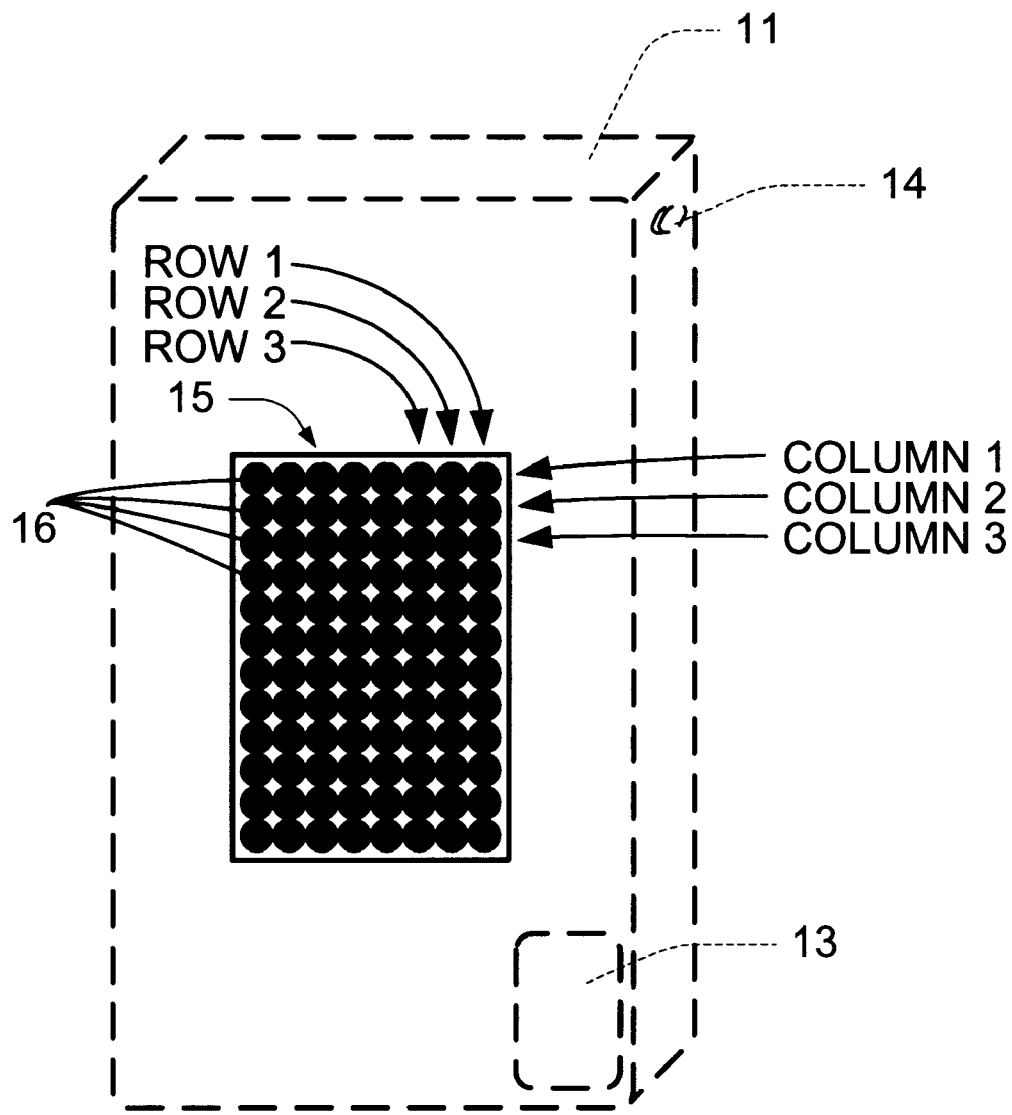
FIG. 3 is a diagrammatic view showing the position and orientation of the image sensor array within the digital camera shown in FIG. 1, with the digital camera in a portrait orientation.

FIG. 3 is the same as FIG. 2, except it shows the orientation of image sensor array 14 when the camera is in its non-default, rotated, portrait orientation. This orientation is rotated 90° from the default, landscape orientation. In this orientation, the rows of image sensor array 15 are oriented vertically, and the columns are oriented horizontally.

Figure 4:
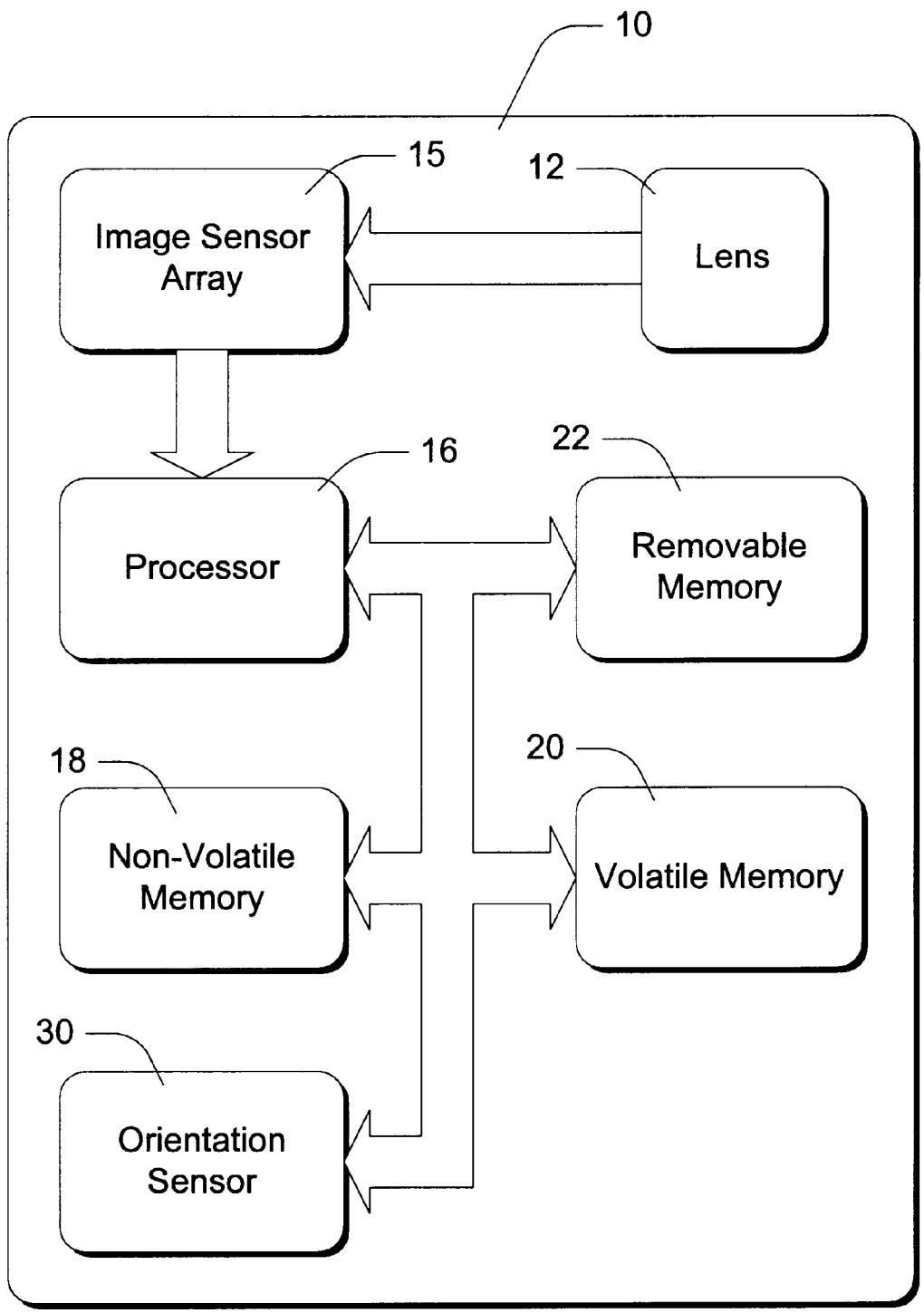
FIG. 4 is a block diagram showing internal components of the digital camera of FIG. 1.

FIG. 4 shows high-level components of digital camera 10, including lens 12, sensor array 15, a microcontroller or microprocessor 16, non-volatile memory 18, volatile memory 20, and removable memory 22. Lens 12 is positioned to focus an image on sensor array 15. Microcontroller 16 is configured to control lens 12 and sensor array 15 in order to capture a digital image in response to a user command (such as by pressing trigger button 14). The digital image at this stage is simply a plurality of pixel values.

Digital images are usually stored as objects or files in some type of nonvolatile memory, according to some pre-defined and standardized format such as "JPEG," "GIF," etc. Within each file, pixels values are typically arranged in a specific order, such as from left-to-right and from top-to-bottom. Thus, the organization and order of pixel values within the image object defines the orientation at which a computer or computer-like device will attempt to display the image. An image object in accordance with the predefined format contains pixel rows that extend horizontally relative to the orientation of the image when the image is eventually displayed.

During or after capturing an image, the camera transfers the pixel values from sensor array 15 to volatile memory 20 for processing. This processing involves arranging or formatting the pixel values into an image object conforming to a pre-defined standard format, such as one of the "JPEG" or "GIF" standards mentioned above. The processing often includes data compression. Once the image has been formatted and compressed, it is transferred to removable memory 22. The removable memory can be removed from the camera and plugged into a computer or other device for viewing or downloading the images stored thereon.

In addition to the components above, camera 10 includes an orientation sensor 30 within the body of the camera to indicate the orientation of the image sensor when an image is captured. The orientation sensor indicates whether the camera is being held in its default, landscape orientation, as shown in FIGS. 1 and 2, or in a rotated, portrait orientation as shown in FIG. 3, that is 90° from the landscape orientation. The sensor is connected so that it can be read by microcontroller 16. The sensor enables automatic digital rotation of captured images to correct for different orientations of the image sensor.

Figure 5:
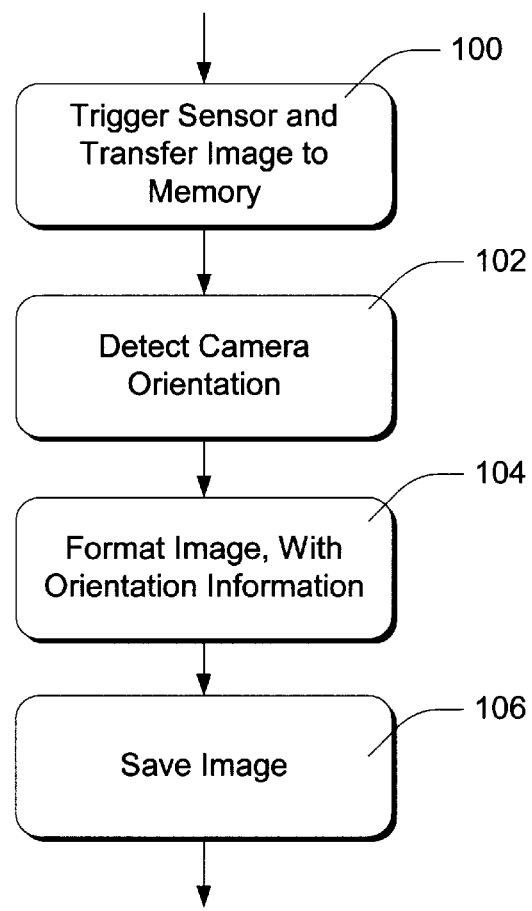
FIG. 5 is a flowchart showing preferred methodological steps in accordance with the invention.

To capture an image, microcontroller 16 is configured or programmed to perform the steps indicated in FIG. 5. A first step 100 comprises activating the image sensor 15 and transferring an image from the image sensor to volatile memory 20. The image comprises rows and columns of pixel values corresponding to the rows and columns of individual pixel sensors. Generally, the pixel values are written to volatile memory 20 in the same order in which they are read from sensor array 15.

A step 102, actually performed either immediately before, immediately after, or concurrently with step 100, comprising detecting and noting the orientation of the camera and image sensor during image capture. Specifically, this step comprises detecting and noting whether the camera is in its default orientation or its rotated orientation.

A step 104 is then performed of formatting the image in the predefined digital format. The image is formatted in such a way that it indicates correct orientation of the image based on the orientation of the camera and image sensor when the image was captured, as indicated by the orientation sensor. This can be done in at least two different ways. One way is to embed a flag within the formatted image object that specifies the correct orientation by specifying the orientation of the camera when the image was captured. Actual rotation of the digital image can then be performed outside the camera, by a computer or other processing device, prior to viewing.

Another way is for the microcontroller of the camera itself to automatically rotate the image to correct for camera rotation—to re-order pixel values from the image sensor and to thereby orient the image within the predefined digital format depending on the orientation of the image sensor when the image was captured. In this embodiment, the camera automatically rearranges pixel values within the predefined digital format of the image object to represent the corrected orientation of the image. If the digital camera was in the default orientation when the image was captured, the controller writes the rows of pixel data to corresponding pixel rows of the image object. However, if the digital camera was not in the default orientation when capturing the image, the controller writes the columns of pixel values from the image sensors to corresponding pixel rows of the image object. This effectively rotates the image within the image object, so that it will be displayed correctly without further manipulations when transferred to a viewing device such as a personal computer.

Figure 6:
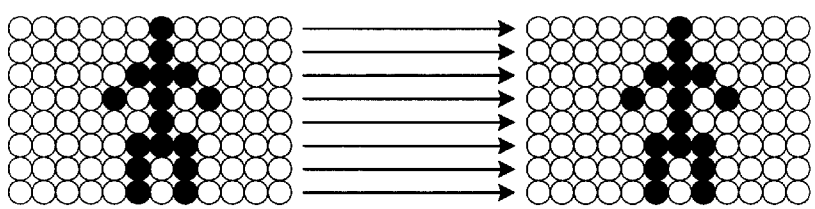
FIG. 6 is a conceptual view showing formatting of an image without rotation.
Figure 7:
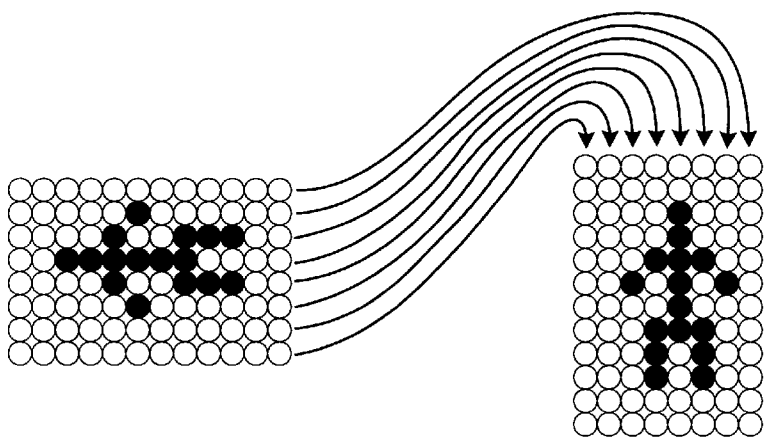
FIG. 7 is a conceptual view showing formatting of an image with rotation.

Such digital rotation of an image is illustrated in FIGS. 6 and 7. On the left, each figure shows an array of pixels as they are read from the image sensor array. On the right, each figure shows the same pixels as they are arranged in an actual image object. In FIG. 6, a landscape image is shown. No rotation is performed because the sensor indicated that the camera was in the landscape orientation when the image was captures. Image sensor rows are transferred directly to image object rows. In FIG. 7, however, the sensor indicated a portrait orientation. Accordingly, rows are reformatted as columns to thereby rotate the image by 90. FIG. 7 illustrates a clockwise rotation of an image.

Step 106 comprises saving the image in the predefined format, in non-volatile memory 18. This step comprises writing the rows and columns of pixel values to an image object having the predefined format. From there, the image can be transferred to a device other than the camera for viewing.

Note that various types of automatic orientation sensors can be used, such as mercury switches, self-orienting switches, optical sensors, and gyroscopic devices. Furthermore, the orientation sensors can conceivably infer orientation from some factor relating to the user's handling of the camera, such as by which of multiple activation buttons the user activates to capture a picture. As another alternative, a sensor or sensors could detect the position of a user's hands and fingers on the camera to detect camera orientation.

The invention eliminates the time-consuming step of previewing each picture as it is downloaded to a personal computer. In one embodiment, orientation information supplements actual pixel data, allowing the personal computer to automatically rotate pictures that were taken with the camera in a non-default orientation. In the other embodiment, the camera itself automatically rotates the images before saving them or transferring them to a personal computer or other storage device.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A digital camera comprising:

an image sensor that digitally captures images;

an optical sensor that differentiates between landscape and portrait orientations of the image sensor when capturing images;

the digital camera inserting an indicator in a captured image to indicate whether the image has been captured in a landscape orientation or a portrait orientation as differentiated by the optical sensor.

2. A digital camera comprising:

an image sensor that digitally captures images;

a gyroscopic device that differentiates between landscape and portrait orientations of the image sensor when capturing images;

the digital camera inserting an indicator in a captured image to indicate whether the image has been captured in a landscape orientation or a portrait orientation as differentiated by the gyroscopic device.

3. A method of capturing a digital image using a digital camera, comprising:

capturing an image from an image sensor;

detecting orientation of the image sensor when capturing the image based on a user's contact with the digital camera;

saving the image in a predefined format that includes an indicator of whether the image has been captured in a landscape orientation or a portrait orientation.

4. A method of capturing a digital image comprising:

capturing an image from an image sensor;

detecting orientation of the image sensor when capturing the image with an optical sensor;

saving the image in a predefined format that includes an indicator of whether the image has been captured in a landscape orientation or a portrait orientation as detected by the optical sensor.

5. A method of capturing a digital image comprising:

capturing an image from an image sensor;

detecting orientation of the image sensor when capturing the image with a gyroscopic device;

saving the image in a predefined format that includes an indicator of whether the image has been captured in a landscape orientation or a portrait orientation as detected by the gyroscopic device.

6. A digital camera comprising:

an image sensor that digitally captures images;

an orientation sensor that differentiates between landscape and portrait orientations of the image sensor based on a user's contact with the digital camera when capturing images.

7. A digital camera as recited in claim 6, wherein the digital camera inserts an indicator in a captured image to indicate whether the image has been captured in a landscape orientation or a portrait orientation as differentiated by the orientation sensor.

8. A digital camera as recited in claim 6, wherein the orientation sensor indicates the differentiated orientation of the image sensor to enable subsequent digital rotation of the captured images.

9. A digital camera as recited in claim 6, further comprising a processor that formats captured images in a predefined image format, the predefined image format including an indicator to indicate the differentiated orientation.

10. A digital camera as recited in claim 6, further comprising a controller configured to transfer captured images from the image sensor and to format the captured images in a predefined digital format, the predefined digital format including an indicator to indicate the differentiated orientation.

11. A digital camera comprising:

an image sensor that digitally captures images;

a non-gravity-based orientation sensor that differentiates between landscape and portrait orientations of the image sensor.

12. A digital camera as recited in claim 11 wherein the orientation sensor is an optical sensor.

13. A digital camera as recited in claim 11 wherein the orientation sensor is a gyroscopic device.

14. A digital camera as recited in claim 11 wherein the orientation sensor senses a user's contact with the camera to differentiate between landscape and portrait orientations.

15. A digital camera as recited in claim 11, wherein the digital camera inserts an indicator in a captured image to indicate whether the image has been captured in a landscape orientation or a portrait orientation as differentiated by the orientation sensor.

* * * * *